United States Patent [19]

Kasahara et al.

[11] Patent Number: 5,039,714

[45] Date of Patent: Aug. 13, 1991

[54] RUBBER-MODIFIED POLYSTYRENE RESIN COMPOSITION

[75] Inventors: Hideo Kasahara, Yokosuka; Masashi Sakamoto; Hiroaki Ishikawa, both of Yokohama; Kiyoshi Maeda, Yokohama, all of Japan

[73] Assignee: Asahi Kasei Kogyo Kabushiki Kaisha, Osaka, Japan

[21] Appl. No.: 335,373

[22] Filed: Apr. 10, 1989

[30] Foreign Application Priority Data

Apr. 11, 1988 [JP] Japan ................................. 63-87305
Apr. 27, 1988 [JP] Japan ............................... 63-102769

[51] Int. Cl.$^5$ ...................... C08F 36/04; C08F 236/04
[52] U.S. Cl. .................................... 521/148; 521/139; 521/140; 521/146; 524/267; 524/284; 524/394; 524/502; 525/100; 525/232; 525/209
[58] Field of Search ............... 521/134, 139, 140, 146; 524/284, 394, 294, 502, 267; 525/236, 209, 100

[56] References Cited

U.S. PATENT DOCUMENTS 4,493,922 1/1985 Echte et al. .

FOREIGN PATENT DOCUMENTS

| | | | |
|---|---|---|---|
| 55-3494 | 1/1980 | Japan | 525/236 |
| 57-172948 | 10/1982 | Japan | 525/236 |
| 57-187345 | 11/1982 | Japan | 525/236 |
| 57-187346 | 11/1982 | Japan | 525/236 |
| 61-183339 | 8/1986 | Japan | 525/236 |
| 61-183341 | 8/1986 | Japan | 525/236 |

OTHER PUBLICATIONS

"Modern Plastics", 11/72, pp. 114–115.
"Plastics Age", 1974, vol. 20, May, p. 107.

*Primary Examiner*—Jacob Ziegler
*Attorney, Agent, or Firm*—Birch, Stewart, Kolasch & Birch

[57] ABSTRACT

A high-gloss, impact-resistant rubber-modified polystyrene composition, characterized in that said rubber-modified polystyrene consists essentially of
(i) a polystyrene,
(ii) dispersed particles of elastomeric polymers, and optionally polydimethylsiloxane and at least one member selected from the group consisting of mineral oil, and metallic salts or amides of higher fatty acids based on the total weight of the composition.

12 Claims, No Drawings

RUBBER-MODIFIED POLYSTYRENE RESIN COMPOSITION

BACKGROUND OF THE INVENTION

Industrial Application Areas

This invention relates to an impact-resistant polystyrene resin composition offering a well-balanced combination of impact strength and gloss.

Rubber-modified polystyrene has widely been used in components of domestic electric appliances and other like appliances. However, this material is inferior to the conventional ABS resin in relation to gloss and impact strength of finished products. Another drawback has been its poor colorability. Recently, there has been a growing demand for rubber-modified polystyrene that would compare favorably with ABS resin from the standpoint of cost and applicability to the thin-walled products.

The resin composition of the present invention excels in gloss, impact strength, and rigidity. Thus, the resin composition of the present invention enables the production of injection-molded products, extruded sheets, and vacuum-formed products with high impact strength and good gloss, which are comparable to those obtained by using expensive ABS resin. Thus, it can be of considerable value as an economical resin.

Related-Art Statement

Rubber-modified polystyrene has been widely used in the industry for a long period of time. Normally the rubber particle size dispersed is polystyrene matrix is about 1.0–5.0 microns. Recently, to achieve high gloss in molded products, rubber-modified polystyrenes with a smaller rubber particle size have been developed and introduced to the market. However, products with 1.0 micron or less in rubber particle size is characterized with a substantially low impact strength, and for this reason, desirable resins have not yet been obtained from these products. Further, to improve the balance of impact strength and gloss, a composition comprised of a blend of rubber-modified polystyrene containing rubber particles less than 1.0 micron in particle size and those containing larger rubber particles, have been disclosed in existing literature, such as Japanese Patent Publication B46-41467, Japanese Patent Publication B59-1519, U.S. Pat. No. 4,146,589, U.S. Pat. No. 4,214,056, and U.S. Pat. No. 4,493,922. However, the large particles used in these prior art were of 2 microns or greater. These large particles gave low surface gloss of the molded article (In particular, those large particles gave a large "gloss gradient," which means the gloss value of the parts in the molded articles which are further from the injection gate have a sharply lower gloss, as compared with the parts which are near the gate). Also, when these products are molded under a low mold temperature, the gloss markedly decreased.

Other, resin compositions made of rubber-modified styrene resin and organic polysiloxane have been disclosed in existing literature such as Modern Plastics, November 1972, pp. 114–115; Plastics Age, 1974, Vol. 20, May, p. 107; Japanese Patent Laid-Open A55-3494; Japanese Patent Laid-Open A53-124561; Japanese Patent Laid-Open A57-172948; Japanese Patent Laid-Open A57-187345; and Japanese Patent Laid-Open A57-187346. However, such mixtures, in which rubber-modified polystyrene in which a small rubber particle size is used, have not yielded a resin composition with desirable properties.

Further, another resin compositions made of rubber-modified polystyrene resin, polydimethylsiloxane, and metallic salts of higher fatty acids are disclosed in Japanese Patent Laid-Open A61-183339; and those comprised of rubber-modified styrene resin, polydimethylsiloxane, and amides of higher fatty acids are disclosed in Japanese Laid-Open A61-183341. These products also have not yielded a resin composition with desirable properties when used in conjunction with rubber-modified polystyrene with a small rubber particle size.

To meet the market demand for rubber-modified polystyrene with a well-balanced combination of properties, as noted above, it is necessary to produce a rubber-modified polystyrene resin with a well-balanced combination of properties such as good surface gloss (especially a high gloss value and a small gloss gradient) in molded products, high impact strength, and high rigidity.

SUMMARY OF THE INVENTION

The object of the present invention is to provide a low-cost rubber-modified polystyrene resin with a well-balanced combination of properties such as good surface gloss in molded products, high impact strength, and high rigidity, as noted above.

This objective can be attained through use of the resin composition of this invention, which is comprised of a rubber-modified polystyrene with a special microstructure.

This objective can be attained even more effectively through the addition of a specific amount of polydimethylsiloxane to the rubber-modified polystyrene with the above-noted special microstructure. The objective can be attained even more effectively through the further addition of specific amounts of a mineral oil, metallic salts of higher fatty acids, or amides of higher fatty acids.

DETAILED DESCRIPTION OF PREFERRED EMBODIMENTS

Specifically, this invention concerns a polystyrene resin composition offering excellent gloss and impact strength, characterized in that, in this impact-resistant polystyrene resin composition, elastomeric polymers are dispersed in particle form in the rubber-modified polystyrene of said composition, such that the dispersed particles have a particle size distribution consisting of two peaks, a small particle component and a large particle component; such that the small-particle component has a mean particle diameter of 0.1–0.6 microns and consists of single-occlusion-structure particles, while the large-particle size component has a mean particle diameter of 0.7–1.9 microns and consists of cellular (or "salami") structure particles.

The rubber-modified polystyrene under this invention can be manufactured by a bulk polymerization or bulk suspension polymerization process, in which aromatic monovinyl monomers are polymerized in the presence of elastomeric polymers. The rubber-modified polystyrene having a special microstructure, which is a special feature of this invention, can be produced through appropriate control of mixing during the polymerization process or under conditions of stirring during the formation of rubber particles.

The aromatic monovinyl monomers employed in this invention include the following: styrene and o-methylstyrene, p-methylstyrene, m-methylstyrene, 2,4-dimethylstyrene, ethylstyrene, p-tert-butylstyrene, and other nuclear alkyl substituted styrenes; α-methylstyrene; α-methyl-p-methylstyrene, and related alpha-alkyl substituted styrenes. As elastomeric polymers, polybutadiene and styrene-polybutadiene copolymers can be used. As a polybutadiene, high-cis polybutadiene containing high concentrations of the cis isomer or low-cis polybutadiene containing low concentrations of the cis isomer can be used.

Under this invention, the rubber-modified polystyrene having a rubber particle distribution consisting of two rubber particle size peaks which is essential in the invention, can be manufactured by separately preparing rubber-modified polystyrene containing small rubber particles and rubber-modified polystyrene containing large rubber particles, and by blending the two in an extruder. Alternatively, it can be manufactured by mixing polymeric solutions small rubber particle and large rubber particle in a polymerization reactor.

The small-particle component should have a mean particle size of 0.1–0.6 micron, and preferably 0.2–0.5 micron. A mean particle size less than 0.1 micron will result in reduced impact strength; a mean particle size greater than 0.6 micron will result in low surface gloss, large gloss gradient, in molded products. Furthermore, the small-particle rubber must have a single-occlusion structure (also referred to as the "shell-core" form); otherwise, the product will be of inferior balance of gloss and impact strength. Such small rubber particles having a single-occlusion structure can be manufactured by polymerizing styrene in the presence of polybutadiene or block copolymers of styrene and butadiene. It is necessary that the large-particle component have a mean particle size of 0.7–1.9 microns, preferably 1.0–1.8 microns, more preferably 1.0–1.5 micron. A means particle diameter of less than 0.7 micron would result in lower impact strength; likewise, a mean particle diameter greater than 1.9 micron would result in lower surface gloss and large gloss gradient of the molded products especially at a low mold temperature.

In this invention, the term "mean particle size" refers to a mean particle size as determined by photographing rubber-modified polystyrene under a transmission electron microscope through the use of the ultra-thin slicing method, measuring the diameters of 1,000 elastomeric polymer particles in the photograph, and calculating the mean particle size according to the following formula:

$$\text{Mean particle diameter} = \frac{\Sigma n_i \cdot D_i^4}{\Sigma n_i \cdot D_i^3}$$

where $n_i$ denotes the number of elastomeric polymer particles of particle diameter s, $D_i$.

The term "polybutadiene component" in this invention means the polybutadiene segment(s) which constitutes a part(s) of the elastomeric polymers of the present invention.

Under this invention, the small-particle component represents 20–95%, or preferably 50–90%, or even more, preferably 60–90%, by weight of the total weight of the polybutadiene component of the elastomeric polymer in the composition; likewise, the large-particle component represents 5–80%, or preferably 10–50%, or even more, preferably 10–40%, by weight. A small-particle component of less than 20% by weight in the composition would result in lower surface gloss, whereas that exceeding 95% by weight in the composition would result in reduced impact strength, neither of which is desirable.

Furthermore, to ensure the adequate surface gloss of molded products, the rubber-modified polystyrene used to attain object of this invention should not contain any substantial amount of rubber particles larger than 2 micron. The condition "not containing any substantial amount" means that rubber particles 2 micron or larger in size constitute less than 20%, by weight, of the polybutadiene component of the elastomeric polymers or preferably, less than 5% by weight. When rubber particle having 2 micron or larger in size constitute more than 20% by weight, the composition will have an increased gloss gradient and lower gloss in molded products made at a low molding temperature.

In addition, to ensure more effective realization of the objective of this invention, the polydimethylsiloxane used must have a structural unit that can be expressed as

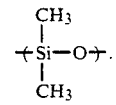

For the rubber-modified polystyrene having the rubber particle diameters of this invention, none of the organic polysiloxane described in the existing literature, other than polydimethylsiloxane, will yield desirable resin compositions. Preferably, the polydimethylsiloxane should have a viscosity of 10–10,000 centistokes at 25° C., which is a relatively low molecular weight range.

Further, the content of polydimethylsiloxane in the impact-resistant polystyrene resin composition should be in the range of 0.005–0.8% by weight. A content less than 0.005% by weight would make it difficult to obtain high impact strength; whereas a content in excess of 0.8% by weight would reduce colorability and harm secondary processing (chemical binding, printing, and painting) of molded resin products. While the cause of reduced colorability and secondary processing properties when the amount of additives are increased is not well understood, it is suspected that this is related to a poor miscibility of polydimethylsiloxane in the rubber-modified polystyrene. For this reason, elaborate control of the polydimethylsiloxane content is essential from the standpoint of obtaining polystyrene resin composition with a desirable impact strength.

Mineral oil is used in conjunction with polydimethyl siloxane for the purpose of realizing the objectives of this invention more effectively. Said mineral oil is commonly used oil, such as a plasticizer of polystyrene, with no particular restrictions as to viscosity or other parameters. Also, the metallic salts of higher fatty acids and amides of higher fatty acids employed in this invention are those fatty acid derivatives, of common use such as those used as slipping agent. Examples include zinc stearate, magnesium stearate, calcium stearate, and ethylene-bis-stearylamide.

In the present invention, the above mineral oils and/or metallic salts of higher fatty acids or amides of higher fatty acids, when used together with the above polydimethylsiloxane, and added to the above rubber-modified polystyrene with a special microstructure, can significantly enhance the impact strength. In case, that the rubber modified polystyrene contained only small rubber particle, addition of additives such as polydimethylsiloxane and metallic salts of high fatty acids yields little improvement in impact strength.

Desirable physical properties can be obtained through the combination, described in this invention, of special microstructures and additives.

Any mineral oil used in conjunction with polydimethylsiloxane in an impact-resistant polystyrene composition should constitute 0.25-4.0% by weight; a content less than 0.25% by weight would contribute little toward enhancing the impact strength, and a content in excess of 4.0% by weight would result in lower heat distortion temperature as well as poor colorability.

Any metallic salt of a higher fatty acid and/or amide of a higher fatty acid used in conjunction with polydimethylsiloxane in an impact-resistant polystyrene composition should be at least 0.1%, but no more than 0.5%, by weight; a content less than 0.1% by weight would contribute little toward enhancing the impact strength. Beyond 0.5% by weight, impact strength will not improve any more than would be expected from the added amount of said additives.

For the production of the impact-resistant polystyrene resin composition under this invention, there are no particular restrictions on the mixing method of the aforementioned polydimethylsiloxane or mineral oil, metallic salts of higher fatty acids, or amides of higher fatty acids to the above-mentioned rubber-modified polystyrene having a special microstructure. It is possible to add polydimethylsiloxane, for example, by polymerizing styrene monomer mixed with polydimethylsiloxane; also, it is possible to add polydimethylsiloxane by melting and blending rubber-modified polystyrene and polydimethylsiloxane through the use of an extruder. It is also possible to produce master pellets containing high concentrations of polydimethylsiloxane from polydimethylsiloxane and polystyrene, and to produce molded products by mixing the master pellets and rubber-modified polystyrene together.

Also, it is possible to add dyes and pigments, slipping agents, fillers, mold-release against, plasticizers, or antistatic agents to the impact-resistant polystyrene resin composition of this invention, as additives.

The resin composition of this invention excels in an overall balance of properties, such as impact strength, gloss and rigidity. In particular, the resin composition obtained by combination of rubber-modified polystyrene possessing a special microstructure and polydimethylsiloxane, or the resin constituents obtained by combination of rubber-modified polystyrene possessing a special microstructure, polydimethylsiloxane, and mineral oil (or metallic salts of higher fatty acids or amides of higher fatty acids), exhibit a significantly improved impact strength over the conventional rubber-modified polystyrene. Also, they offer superior surface gloss when fabricated into molded products, especially injection-molded products, in terms of excellent gloss of parts that are located far from gates. Because of these characteristics, the constituent are useful for the production of large-scale injection-molded products. Further, its excellent colorability reduces the cost of pigmentation.

The resin of this invention can be used as molded products in electronics and in daily goods. It gives especially favorable results in molded products in which bright color is of prime importance.

EXAMPLES

Examples of this invention are given below. The data shown in the Examples were measured by the following methods:

Izod impact strength: ASTM D256.
Flexual strength and flexual modulus: ASTM D790
Gloss: ASTM D638. (The glossiness of the gate part and end-gate part of dumbbell samples were measured.)

EXAMPLES 1-3 AND COMPARISON EXAMPLES 1 AND 2

Rubber-modified polystyrene (A) with a mean particle diameter of 0.2 micron having single occlusion structure, in which the content of the polybutadiene component is 9% by weight, is obtained by mixing and polymerizing styrene monomer in the presence of styrene-butadiene block copolymers. On the other hand, rubber-modified polystyrene (B) with a mean particle diameter of 1.5 microns having cellular structure, in which the content of the polybutadiene component is 12% by weight, is obtained by mixing and polymerizing styrene in the presence of polybutadiene. The rubber-modified polystyrene (A) and the rubber-modified polystyrene (B) are mixed in the ratios shown in Table 1. The mixtures were melted and blended in an extruder to obtain the resin composition. The gloss, Izod impact strength, flexural modulus of the resin composition were evaluated. Results are shown in Table 1.

Mixing rubber-modified polystyrene (A) containing small-diameter rubber particles and rubber-modified polystyrene (B) containing large-diameter rubber particles in appropriate ratios produces a composition offering excellent gloss, especially a high gloss value in the end-gate part, as well as high impact strength. Rubber-modified polystyrene (A) by itself yields a composition with poor impact strength.

EXAMPLE 4 AND COMPARISON EXAMPLES 3 AND 4

Styrene monomers were mixed in the presence of polybutadiene, by controlling the stirring force. This process yield 3 kinds of rubber-modified polystyrene (B), with mean particle diameters of 0.6 micron, 0.9 micron, and 2.7 microns, having a salami structure, and in which the polybutadiene content was 12% by weight. The rubber-modified polystyrene (B) obtained in this manner, 25% by weight, was added to the rubber-modified polystyrene (A), 75% by weight, used in Examples 1-3, as shown in Table 2. The physical properties of the resulting compositions were evaluated as those obtained in Example 1, as shown in Table 2. If the rubber-modified polystyrene to be combined with rubber-modified polystyrene (A) has a mean particle diameter of greater than 1.9 microns, it produces an undesirable result, that is, a large gloss gradient (with a low gloss value at the end-gate part). Also, a mean particle diameter of less than 0.5 micron gives the undesirably low impact strength.

COMPARISON EXAMPLE 5

In Example 3, rubber-modified polystyrene (A) was replaced with a rubber-modified polystyrene having a salami structure with a mean particle diameter of 0.7 micron, and with a polybutadiene component, in the resin, constituting 9% by weight; and similar evaluations were conducted. The results are shown in Table 2. The results indicate undesirably large gloss gradient.

the results show significant improvements in impact strength, in addition to superior gloss.

TABLE 1

|  | Comparison Example 1 | Example 1 | Example 2 | Example 3 | Comparison Example 2 |
| --- | --- | --- | --- | --- | --- |
| Composition |  |  |  |  |  |
| Rubber-modified polystyrene (A) (mean particle diameter: 0.2 microns) | 100% | 90% | 85% | 75% | — |
| Rubber-modified polystyrene (B) (mean particle diameter: 1.5 microns) | — | 10% | 15% | 25% | 100% |
| Physical properties |  |  |  |  |  |
| Izod impact strength (Kg · cm/cm) | 2.5 | 6.3 | 7.5 | 9.0 | 17.0 |
| Gloss (%) |  |  |  |  |  |
| End-gate part | 96 | 96 | 95 | 91 | 55 |
| Gate part | 99 | 99 | 99 | 99 | 88 |
| Flexural modulus (Kg/cm$^2$) | 21,700 | 22,500 | 22,300 | 22,200 | 22,000 |

TABLE 2

|  | Comparison Example 3 | Example 4 | Example 3 | Comparison Example 4 | Comparison Example 5 |
| --- | --- | --- | --- | --- | --- |
| Composition |  |  |  |  |  |
| Rubber-modified polystyrene (A) 75% Mean particle diameter (micron) | 0.2 | 0.2 | 0.2 | 0.2 | 0.7 |
| Rubber-modified polystyrene (B) 25% Mean particle diameter (micron) | 0.6 | 0.9 | 1.5 | 2.7 | 1.5 |
| Physical properties |  |  |  |  |  |
| Izod impact strength (Kg · cm/cm) | 3.5 | 6.5 | 9.0 | 8.5 | 11.5 |
| Gloss (%) |  |  |  |  |  |
| End-gate part | 95 | 93 | 91 | 70 | 70 |
| Gate part | 99 | 99 | 99 | 88 | 88 |
| Flexural modulus | 23,700 | 23,200 | 22,200 | 20,400 | 21,000 |

EXAMPLES 5 and 6

Rubber-modified polystyrene (A) with a mean particle diameter of 0.3 micron having single occlusion structure, in which the content of the polybutadiene component is 9% by weight, is obtained by mixing and polymerizing styrene monomers in the presence of styrene-butadiene block copolymers. On the other hand, rubber-modified polystyrene (B) with a mean particle diameter of 1.2 microns having a salami structure, in which the content of the polybutadiene component is 12% by weight, is obtained by mixing and polymerizing styrene in the presence of polybutadiene. The rubber-modified polystyrene (A) and the rubber-modified polystyrene (B) are mixed to produce resin compositions similar to Examples 2 and 3. Their physical properties were measured. The results are shown in Table 3. The products exhibit superior impact strength, and especially high gloss values at the end-gate part.

EXAMPLE 7

The same procedures were used as in Example 5, except that 0.08 part by weight of polydimethylsiloxane, of which viscosity is 500 centistokes, was added to 100 parts by weight in total of rubber-modified polystyrene (A) and rubber-modified polystyrene (B). Results of physical property measurements of these compositions are given in Table 3. Compared with Example 5,

EXAMPLE 8

The same procedures were employed as in Example 7, except that rubber-modified polystyrene (A) and rubber-modified polystyrene (B) were mixed in the same ratio as the ratio used in Example 6. Results of physical property measurements of these constituents are given in Table 3. Compared with Example 6, the results show significant improvements in impact strength, in addition to superior gloss.

EXAMPLES 9–11

The same procedures were used as in Example 8, except that the mixing ratio of rubber-modified polystyrene (A) and rubber-modified polystyrene (B) was changed to that shown in Table 3. Results of physical property measurements of these compositions are given in Table 3.

COMPARISON EXAMPLES 6 AND 7

Resin compositions were obtained by mixing 0.05 part by weight of polydimethylsiloxane with 100 parts by weight each of the polystyrene (B) and polystyrene (A) used in Example 7, and physical properties of the products were measured. Results are shown in Table 3. Addition of polydimethylsiloxane to polystyrene (A) alone does not yield products with high impact strength. Similarly, polystyrene (B) alone does not yield products with a high gloss value.

TABLE 3

| | Example 5 | Example 6 | Example 7 | Example 8 | Example 9 | Example 10 | Example 11 | Comparison Example 6 | Comparison Example 7 |
|---|---|---|---|---|---|---|---|---|---|
| Composition | | | | | | | | | |
| Rubber-modified polystyrene (A) (mean particle diameter: 0.3 micron) | 85% | 75% | 85% | 75% | 90% | 60% | 30% | — | 100% |
| Rubber-modified polystyrene (B) (mean particle diameter: 1.2 microns) | 15% | 25% | 15% | 25% | 10% | 40% | 70% | 100% | — |
| Polydimethylsiloxane | Not added | Not added | Added | Added | Added | Added | Added | Added | Added |
| Physical properties | | | | | | | | | |
| Izod impact strength (Kg · cm/cm) | 6.3 | 6.6 | 10.7 | 12.3 | 9.7 | 14.3 | 16.1 | 15.9 | 4.1 |
| Gloss (%) | | | | | | | | | |
| End gate part | 95 | 93 | 94 | 90 | 95 | 88 | 82 | 60 | 95 |
| Gate part | 99 | 99 | 99 | 99 | 99 | 97 | 95 | 88 | 99 |
| Flexural modulus (Kg · cm/cm) | 22,100 | 22,000 | 22,100 | 22,200 | 22,400 | 22,000 | 21,500 | 20,000 | 21,500 |
| Colorability | 5 | 5 | 5 | 5 | 5 | 4 | 3 | 1 | 5 |

*Colorability was evaluated by ranking the ease of coloring of products, using a rank value of 1 for 100% rubber-modified polystyrene (B), with a rank value of 5 representing the best value.

EXAMPLE 12, COMPARISON EXAMPLES 8 AND 9

Resin compositions were obtained in a manner similar to Example 8, except that the rubber-modified polystyrene (B) used in Example 8 was replaced with those used in Example 4, Comparison Example 3, and Comparison Example 4. Results of physical property measurements are shown in Table 4.

EXAMPLE 13, COMPARISON EXAMPLE 10

Styrene monomers were mixed and polymerized in the presence of polybutadiene under controlled stirring. The rubber-modified polystyrene with mean particle diameters of 1.8 and 6.2 microns, having a salami structure, in which the polybutadiene composition in the resin was 12% by weight, was obtained. Resin compositions were obtained in the same manner as in Example 8, except that the polystyrene obtained by the above procedure was used as rubber-modified polystyrene (B). Results of physical property measurements are given in Table 4.

COMPARISON EXAMPLE 11

Resin compositions were obtained in the same manner as in Comparison Example 10, except that polydimethylsiloxane was not added. Results of physical property measurements are given in Table 4.

Table 4 indicates that when the rubber-modified polystyrene to be combined with rubber-modified polystyrene (A) has a mean particle diameter in excess of 2 microns, the result is an undesirable increase in the gloss gradient (with a lower gloss value at the end gate). Also, the Table shows that when the mean particle diameter is as low as 0.6 micron, there is an undesirable decrease in impact strength.

Also, if the rubber-modified polystyrene to be combined with the rubber-modified polystyrene (A) has an excessively large mean particle diameter, addition of polydimethylsiloxane to the mixture will not improve its impact strength any more.

TABLE 4

| | Comparison Example 8 | Example 12 | Example 8 | Example 13 | Comparison Example 9 | Comparison Example 10 | Comparison Example 11 |
|---|---|---|---|---|---|---|---|
| Composition | | | | | | | |
| The mean rubber particle diameter of rubber modified polystyrene (B) to be combined with rubber-modified polystyrene (A) | 0.6 micron | 0.9 micron | 1.2 micron | 1.8 micron | 2.7 micron | 5.2 micron | 5.2 micron |
| Polydimethylsiloxane | Added | Added | Added | Added | Added | Added | Not added |
| Physical properties | | | | | | | |
| Izod impact strength (Kg · cm/cm) | 5.1 | 10.2 | 12.3 | 12.7 | 10.5 | 9.8 | 9.6 |
| Gloss (%) | | | | | | | |
| End-gate part | 95 | 92 | 90 | 82 | 72 | 64 | 63 |
| Gate part | 99 | 99 | 99 | 96 | 89 | 87 | 86 |
| Flexural modulus (Kg/cm²) | 23,500 | 23,100 | 22,200 | 22,200 | 20,300 | 19,000 | 19,500 |
| Colorability | 5 | 5 | 5 | 5 | 5 | 4 | 4 |

EXAMPLES 14–23

Polydimethylsiloxane, mineral oils, and zinc stearate were mixed onto the resin composition of Example 1. The additive contents in the final compositions are shown in Table 5. Results of physical property measurements are given in Table 5.

In case that rubber-modified polystyrenes contain both small rubber particles having appropriate mean diameter and large rubber particles having appropriate mean diameter, both of which being mixed in an appropriate ratio, the addition of appropriate amounts of polydimethylsiloxane and mineral oil (Examples 14 and 15); or addition of appropriate amounts of polydimethylsiloxane and zinc stearate (Examples 16 and 17), would make compositions with high impact strength and high gloss at end gate parts.

Further, if the rubber-modified polystyrene as such small particles and large particles contains appropriate amounts of both mineral oil and zinc stearate, in addition to polydimethylsiloxane, the composition with substantially high impact strength (Example 23).

EXAMPLE 25

Resin compositions were obtained in the same manner as in Example 16, except that zinc stearate was replaced by ethylene-bis-stearyl amide, such that its content in the compositions was adjusted to 0.5% by weight. The results were: Izod impact strength: 10.2 Kg.cm/cm; flexural modulus: 21,200 Kg/cm$^2$; and Gloss; 97% at the end-gate part and 99% at the gate part.

TABLE 6

|  | Comparison Example 12 | Example 24 | Example 23 | Comparison Example 13 | Comparison Example 14 |
|---|---|---|---|---|---|
| Composition |  |  |  |  |  |
| The mean rubber particle diameter of rubber-modified polystyrene (B) to be combined with rubber-modified polystyrene (A) | 0.6 micron | 0.9 micron | 1.5 microns | 2.7 microns | 5.8 microns |
| Content in the composition |  |  |  |  |  |
| Polydimethylsiloxane (wt. %) | 0.05 | 0.05 | 0.05 | 0.05 | 0.05 |
| Mineral oil (wt. %) | 2.5 | 2.5 | 2.5 | 2.5 | 2.5 |
| Zinc stearate (wt. %) | 0.3 | 0.3 | 0.3 | 0.3 | 0.3 |
| Physical properties |  |  |  |  |  |
| Izod impact strength (Kg · cm/cm) | 4.5 | 9.0 | 13.5 | 8.5 | 7.5 |
| Flexural modulus (Kg/cm$^2$) | 21,500 | 21,000 | 21,000 | 21,000 | 20,000 |
| Vicat softening point (°C.) | 99 | 99 | 99 | 99 | 99 |
| Gloss (%) |  |  |  |  |  |
| End-gate part | 98 | 97 | 97 | 82 | 72 |
| Gate part | 99 | 99 | 99 | 92 | 88 |

TABLE 5

|  | Example 14 | Example 15 | Example 16 | Example 17 | Example 18 | Example 19 | Example 20 | Example 21 | Example 22 | Example 23 |
|---|---|---|---|---|---|---|---|---|---|---|
| Composition |  |  |  |  |  |  |  |  |  |  |
| Polydimethylsiloxane (wt. %) | 0.05 | 0.05 | 0.05 | 0.05 | 0 | 0.05 | 0.05 | 0.05 | 0.05 | 0.05 |
| Mineral oil (wt. %) | 2.5 | 1.0 | 0 | 0 | 2.5 | 0 | 0.1 | 0 | 5.0 | 2.5 |
| Zinc stearate (wt. %) | 0 | 0 | 0.3 | 0.1 | 0.3 | 0 | 0 | 0.03 | 0 | 0.3 |
| Physical properties |  |  |  |  |  |  |  |  |  |  |
| Izod impact strength (Kg · cm/cm) | 11.1 | 9.3 | 11.1 | 9.1 | 6.5 | 7.3 | 7.6 | 7.7 | 11.3 | 13.5 |
| Flexural modulus (Kg/cm$^2$) | 21,000 | 21,300 | 21,500 | 21,700 | 21,000 | 21,700 | 21,700 | 21,700 | 19,800 | 21,000 |
| Vicat softening point (°C.) | 99 | 103 | 105 | 105 | 99 | 105 | 105 | 105 | 92 | 99 |
| Glass (%) |  |  |  |  |  |  |  |  |  |  |
| End gate part | 97 | 97 | 97 | 97 | 97 | 97 | 97 | 97 | 94 | 97 |
| Gate part | 99 | 99 | 99 | 99 | 99 | 99 | 99 | 99 | 97 | 99 |

COMPARISON EXAMPLE 12, EXAMPLE 24, AND COMPARISON EXAMPLES 13, 14

Resin compositions were obtained in the same manner as in Example 23, except that the rubber-modified polystyrene (B) of Example 23 was substituted with the rubber-modified polystyrene (B) used in Comparison Example 8, Example 12, Comparison Example 9, and Comparison Example 10, Results of physical property measurements are given in Table 6.

What is claimed is:

1. A high-gloss, impact-resistant rubber-modified composition comprises
   (i) a polystyrene,
   (ii) dispersed particles of elastomeric polymers having two peaks in particle size distribution; one peak being a small-particle component having a mean particle diameter of 0.1 to 0.6 micron with single occlusion structure and the other being a large-particle component having a mean particle diameter of 0.7 to 1.9 microns with cellular particle structure.

2. The composition of claim 1 wherein 20-95% by weight of the total amount of a polybutadiene component of the elastomeric polymers in the composition are small-particle component, and 5-80% by weight are large-particle component.

3. The composition of claim 1 wherein said small-particle particle component has a mean particle diameter of 0.2-0.5 micron.

4. The composition of claim 1 wherein the large-particle component has a mean particle diameter of 1.0-1.8 microns.

5. The composition of claim 1, which further comprises 0.05 to 0.8% by weight of polyoxydimethylsiloxane.

6. The composition of claim 5, wherein 20-95% by weight of the total amount of a polybutadiene component of the elastomeric polymers in the composition are small-particle component, and 5-80% by weight are large particle component.

7. The composition of claim 5 wherein said small-particle component has a mean particle diameter of 0.2-0.5 micron.

8. The composition of claims 5 wherein the large-particle component has a mean particle diameter of 1.0-1.8 microns.

9. The composition of claim 5, which further comprises at least one member selected from the group consisting of 0.25 to 4.0 by weight of mineral oil, 0.1 to 0.5% by weight of metallic salts or amides of higher fatty acids and mixtures thereof.

10. The composition of claim 9, wherein 20-95% by weight of the total amount of a polybutadiene component of the elastomeric polymers in the composition are small-particle component and 5-80% by weight are large-particle component.

11. The composition of claim 9 wherein said small-particle component has a mean particle diameter of 0.2-0.5 micron.

12. The composition of claims 9 wherein the large-particle component has a mean particle diameter of 1.0-1.8 microns.

* * * * *

UNITED STATES PATENT AND TRADEMARK OFFICE
CERTIFICATE OF CORRECTION

PATENT NO. : 5,039,714

DATED : August 13, 1991

INVENTOR(S) : Hideo Kasahara, Masashi Sakamoto, Hiroaki Ishikawa and Kiyoshi Maeda It is certified that error appears in the above-identified patent and that said Letters Patent is hereby corrected as shown below:

At column 13 of the patent, Claim 5, line 16 change "0.05" to --0.005--.

Signed and Sealed this

Sixteenth Day of February, 1993

Attest:

STEPHEN G. KUNIN

*Attesting Officer*     Acting Commissioner of Patents and Trademarks